United States Patent
Kapetanovic et al.

(10) Patent No.: US 10,601,612 B2
(45) Date of Patent: Mar. 24, 2020

(54) CHANNEL ESTIMATION EVALUATION IN MIMO SYSTEMS

(71) Applicant: Telefonaktiebolaget LM Ericsson (publ), Stockholm (SE)

(72) Inventors: Dzevdan Kapetanovic, Lund (SE); Rocco Di Taranto, Lund (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 15/775,102

(22) PCT Filed: Nov. 12, 2015

(86) PCT No.: PCT/EP2015/076476
§ 371 (c)(1),
(2) Date: May 10, 2018

(87) PCT Pub. No.: WO2017/080608
PCT Pub. Date: May 18, 2017

(65) Prior Publication Data
US 2018/0375690 A1    Dec. 27, 2018

(51) Int. Cl.
*H04L 25/02* (2006.01)
*H04W 24/08* (2009.01)

(52) U.S. Cl.
CPC ...... *H04L 25/0222* (2013.01); *H04L 25/0224* (2013.01); *H04W 24/08* (2013.01)

(58) Field of Classification Search
CPC . H04L 25/0222; H04L 25/0224; H04W 24/08
See application file for complete search history.

(56) References Cited

U.S. PATENT DOCUMENTS 9,755,797 B2 *   9/2017   Wu ................. G01S 5/0036
9,813,208 B2 *  11/2017   Kim ................ H04B 7/024
(Continued)

OTHER PUBLICATIONS

Di Taranto et al., "Location-Aware Communications for 5G Networks: How location information can improve scalability, latency, and robustness of 5G," in IEEE Signal Processing Magazine, vol. 31, No. 6, pp. 102-112, Nov. 2014 (Year: 2014).*

(Continued)

*Primary Examiner* — Michelle M Koeth
(74) *Attorney, Agent, or Firm* — Leffler Intellectual Property Law, PLLC

(57) ABSTRACT

The present disclosure relates to methods, a device and a system for evaluation of channel estimate. One method is performed in a first access point arranged to communicate with one or more wireless devices through information streams that are created using multiple co-located antennas. The method comprises transmitting or receiving a packet A, to/from, the first wireless device, wherein the packet A is transmitted using a precoder determined using the channel estimate, retrieving information about possibly interfering transmissions C between further access points in the vicinity of the first access point, and respective second wireless devices; wherein the information comprises location information and timing information related to the possibly interfering transmissions, determining spatial separations between the transmissions A and C and evaluating the channel estimate, based on the determined spatial separations.

14 Claims, 8 Drawing Sheets

(56) References Cited

U.S. PATENT DOCUMENTS

| | | | |
|---|---|---|---|
| 9,980,271 B2* | 5/2018 | Soriaga | H04W 72/082 |
| 2011/0222472 A1 | 9/2011 | Breit et al. | |
| 2013/0114441 A1 | 5/2013 | Yoo et al. | |
| 2014/0056204 A1 | 2/2014 | Suh et al. | |
| 2014/0071955 A1 | 3/2014 | Du et al. | |
| 2015/0078353 A1 | 3/2015 | Zhang et al. | |
| 2015/0341090 A1* | 11/2015 | Oh | H04B 15/00 375/227 |
| 2017/0310417 A1* | 10/2017 | Jung | H04L 1/18 |

OTHER PUBLICATIONS

PCT International Search Report, dated Oct. 7, 2016, in connection with International Application No. PCT/EP2015/076476, all pages.
PCT Written Opinion, dated Oct. 7, 2016, in connection with International Application No. PCT/EP2015/076476, all pages.
Sigurd Schelstraete, "MU BFee Interference channel feedback", IEEE 802.11-15/1087, Sep. 14, 2015, pp. 1-16.
Rocco Di Taranto et al., "Location-Aware Communications for 5G Networks", IEEE Signal Processing Magazine, Nov. 2014, pp. 102-112.
Sigurd Schelstraete, "MU BFee Interference channel feedback", IEEE 802.11-15/0858, Jul. 12, 2015, pp. 1-15.
European Communication dated Jan. 14, 2020 in connection with European Application No. 19203474.2, 4 pages.
European Search Report dated Jan. 14, 2020 in connection with European Application No. 19203474, 1 page.

* cited by examiner

CHANNEL ESTIMATION EVALUATION IN MIMO SYSTEMS

TECHNICAL FIELD

The present disclosure relates to evaluation of channel estimates. In particular the disclosure relates to methods, a device and a system for evaluation of channel estimates.

BACKGROUND

In Institute of Electrical and Electronics Engineers (IEEE), Wireless Local Area Network (WLAN) is standardized in the IEEE 802.1 1 specifications, e.g. in IEEE Standard for Information technology—Tele-communications and information exchange between systems, Local and metropolitan area networks—Specific requirements, Part 1 1: Wireless LAN Medium Access Control (MAC) and Physical Layer (PHY) Specifications.

WLAN is a technology that mainly operates in the 2.4 GHz or 5 GHz band. The IEEE 802.1 1 specifications regulate the physical layer between access points and wireless terminals, MAC layer and other aspects to secure compatibility and interoperability between access points and wireless devices, often referred to as STA when discussing WLAN applications. WLAN is generally operated in unlicensed bands, and as such, communication over WLAN may be subject to interference sources from any number of known and unknown devices. WLAN is commonly used as wireless extensions to fixed broadband access, e.g. in domestic environments and hotspots like airports, train stations and restaurants and the like.

Recently, WLAN has been subject to increased interest from cellular network operators, not only as an extension to fixed broadband access. Instead, the interest is mainly focused on using the WLAN technology as an extension, or alternative to, cellular radio access network technologies. By use of WLAN technology as an extension to cellular radio access network technologies it is contemplated that an ever increasing wireless bandwidth demand may be handled. Cellular operators that currently serve mobile users with, e.g. any of the Third Generation Partnership Project (3GPP) technologies, Long Term Evolution, LTE, Universal Mobile Telecommunications System, UMTS, /Wideband Code Division Multiple Access, WCDMA, or Global System for Mobile communications, GSM, treat WLAN as a technology that may provide good support in their regular cellular networks. The term "operator-controlled WLAN" refers to a WLAN deployment that on some level is integrated with a cellular network operator's existing network and where the 3GPP radio access networks and the WLAN wireless access may even be connected to the same core network and provide the same services.

In WLAN systems, Multi User Multiple Input Multiple Output, MU-MIMO, and transmit Beamforming, TxBF, are based on Channel State Information, CSI, obtained by the access points, APs, during a training sequence, also known as sounding. The CSI comprises a channels estimate or in other words is a snap shot in time of the state of the channel. The natural variability of the wireless channel causes the CSI, and hence also the precoding matrices set up in the AP, to age. Such aging gives rise to loss of beamforming gain and interference cancellation over time. Thus, the CSI needs to be refreshed. However, excessive sounding wastes channel capacity without benefits and too few soundings degrade performance.

Hence there is a need to determine when precoding matrices are outdated and sounding is needed.

SUMMARY

An object of the present disclosure is to provide methods and devices which seek to mitigate, alleviate, or eliminate one or more of the above-identified deficiencies in the art and disadvantages singly or in any combination.

In this disclosure, a solution to the problem outlined above is proposed. In the proposed solution coordination by overlapping Access Points, APs, in an Overlapping Basic Service Set, OBSS, scenario (i.e. a scenario with two or more APs with connected wireless devices, i.e. STAs) is utilized, along with wireless device positions and transmission times, to be able to distinguish between outdated CSI. The solution is based on the below described techniques that will more accurately predict whether the AP should start a sounding sequence or not.

The above object is obtained by a method, performed in a first access point arranged to communicate with one or more wireless devices through information streams that are created using multiple co-located antennas, for evaluation of a channel estimate of a channel between the access point and a first wireless device. The method comprises transmitting or receiving a packet, to or from, the first wireless device, wherein the packet is transmitted using a precoder determined using the channel estimate, retrieving information about possibly interfering transmissions between one or more further access points in the vicinity of the first access point, and respective second wireless devices; wherein the information comprises location information and timing information related to the respective possibly interfering transmissions, determining spatial separations between the transmission of the packet and the possibly interfering transmissions and evaluating the channel estimate, based on the determined spatial separations. The disclosure provides a solution for identifying the need for new sounding frames. The access point retrieves information regarding transmissions in other Basic Service Sets, BSSs, to more accurately decide whether a new sounding sequence is necessary or not. Hence, a way to avoid unnecessary sounding which blocks channel capacity is provided. The solution minimizes the number of cases where the AP receives polluted CSI by the wireless devices. This in turn results in significant throughput gains. Moreover, together with rate adaptation, the disclosure results in more packets being received at the wireless devices by not performing unnecessary sounding, resulting in further throughput gains.

According to some aspects, the transmitting comprises transmitting parallel information streams to multiple wireless devices and the method comprises receiving, from the first wireless device, an interference report comprising information about inter-stream interference, measured by the first wireless device and wherein the evaluating is further based on the interference report. Thus, the access point uses both the information from the possibly interfering transmissions and an interference report from the first wireless device to evaluate the channel estimate. This enables the access point to make a very accurate decision whether to perform sounding or not.

According to some aspects, the presence of inter-stream interference, measured by the wireless device, triggers the first access point to evaluate the channel estimate. Hence, the access point does not need to evaluate the channel estimate without the trigger. This, of course, saves computational and communicational resources at the access point.

According to some aspects, the method comprises receiving, from the first wireless device, information related to successful reception of the packet. Thus, the access point is informed whether the transmitted packet has been successfully received or not.

According to some aspects, the interference report and the information related to successful reception of the packet are included in an acknowledgement, ACK, message. An ACK message is an efficient way of receiving a confirmation that the transmitted packet has been successfully received.

According to some aspects, the method comprises determining whether to transmit a sounding sequence based on the evaluation of the channel estimate. In other words, when the access point has evaluated the channel estimate, it will be able to, based on the evaluation, determine if a new sounding is to take place. By using the evaluation to determine this, the actual correctness of the channel estimate is used to determine if new sounding is to be done.

According to some aspects, the method comprises receiving, from the first wireless device, an interference parameter, comprising information, measured by the first wireless device, about interference of transmissions to or from further access points, and wherein the evaluating is further based on the interference parameter. The evaluation is thus based on both the information about possibly interfering transmissions and on an interference parameter measuring interference from other access points.

According to some aspects, the method comprises determining whether to request the first wireless device to transmit a sounding sequence based on the evaluation of the channel estimate. Hence after evaluation, the access point determines if it should request a sounding sequence from the first wireless device. The determination is thus performed after the first access point has evaluated the channel estimate.

According to some aspects, the information about possibly interfering transmissions is retrieved from a data storage. Hence, the information is easily accessible to the access point. It is a simple matter for the access point to retrieve the data from the data storage.

According to some aspects, the retrieving of information about possibly interfering transmissions, comprises retrieving information about other transmissions within a predefined distance from the first access point. Thereby, the access point may avoid retrieving information regarding further access points' transmissions to wireless devices, or BSSs, which should not have interfering transmissions at BSS of the access point due to the distance between them. In other words, if the further access points are at a predetermined minimum distance away from the access point, the access point does not retrieve information regarding those further access points.

According to some aspects, the information about possibly interfering transmissions between further access points in the vicinity of the first access point, and respective second wireless devices, comprises positioning information defining the positions of the second wireless devices involved in the possibly interfering transmissions. By using this information, the access point can more accurately determine which transmissions were possibly interfering.

According to some aspects, the determining comprises determining distances between the first wireless device and the second wireless devices involved in the possibly interfering transmissions. The likelihood that a transmission to/from the second wireless device has interfered with a transmission to/from the first wireless device increases if the distance decreases. The spatial separation between the wireless devices are for example determined in this way.

The object of the disclosure is further obtained by a method performed in a communication system comprising a data storage and one or more access points configured to communicate with one or more respective wireless devices, for enabling channel estimation evaluation in a first access point. The method comprises storing in the data storage, by the one or more access points, information about transmissions to and/or from the respective wireless devices, wherein the information comprises location information and timing information related to the respective transmissions and providing, to the first access point, information about possibly interfering transmissions between further access points in the vicinity of the first access point and respective wireless devices; wherein the information comprises location information and timing information related to the possibly interfering transmissions. In other words, data is stored in the data storage that can be retrieved by an access point evaluating the channel estimate for reasons explained above. Using a data storage enables multiple access points to access the information to use for evaluating the channel estimate.

According to some aspects, the information comprises positioning information defining the positions of the wireless devices involved in the possibly interfering transmission. The information defining the positions is used as described above and with the same advantages.

According to some aspects, the method comprises automatically deleting information stored in the data storage, relating to transmissions that are older than a predefined time. This is to avoid storing large amounts of data as well as avoiding storing locations of wireless devices over a long time.

According to some aspects, the disclosure also relates to a first access point arranged to communicate with one or more wireless devices through information streams that are created using multiple co-located antennas, the first access point comprising. The first access point comprises a communication interface and processing circuitry. The processing circuitry being configured to cause the first access point to transmit or receive a packet, to or from, the first wireless device, wherein the packet is transmitted using a precoder determined using the channel estimate, to retrieve information about possibly interfering transmissions between one or more further access points in the vicinity of the first access point, and respective second wireless devices; wherein the information comprises location information and timing information related to the respective possibly interfering transmissions, to determine spatial separations between the transmission of the packet and the possibly interfering transmissions and to evaluate the channel estimate, based on the determined spatial separations. The advantages with the first access point are the same as the advantages described above when discussing the method of the first access point.

According to some aspects, the transmitting comprises transmitting parallel information streams to multiple wireless devices, and wherein the processing circuitry is configured to cause the first access point to receive, from the first wireless device, an interference report comprising information about inter-stream interference, measured by the first wireless device and wherein the evaluating is further based on the interference report. The advantages have been previously discussed when discussing the method of the first access point.

According to some aspects, the disclosure also relates to a communication system comprising a data storage and one or more access points configured to communicate with one or more respective wireless devices, for enabling channel estimation evaluation in a first access point. The one or more access points comprise a communication interface and processing circuitry. The processing circuitry being configured to cause the one or more access points to store, in the data storage, information about transmissions to and/or from the respective wireless devices, wherein the information comprises location information and timing information related to the respective transmissions. The data storage comprises a communication interface and processing circuitry. The processing circuitry being configured to cause the data storage to provide, via the communication interface, to the first access point, information about possibly interfering transmissions between further access points in the vicinity of the first access point and respective wireless devices; wherein the information comprises location information and timing information related to the possibly interfering transmissions. In other words, the above described data storage is updated by the access points with information regarding transmissions and the data storage provides the access points information regarding the possibly interfering transmissions. Thus the advantages described above are reached.

According to some aspects, the information comprises positioning information defining the positions of the wireless devices involved in the possibly interfering transmissions. The information defining the positions is used as described above and with the same advantages.

According to some aspects, the disclosure also relates to a computer program comprising computer program code which, when executed in a programmable controller of a first access point, causes the first access point to execute the methods described above and below.

BRIEF DESCRIPTION OF THE DRAWINGS

The foregoing will be apparent from the following more particular description of the example embodiments, as illustrated in the accompanying drawings in which like reference characters refer to like parts throughout the different views. The drawings are not necessarily to scale, emphasis instead being placed upon illustrating the example embodiments.

ABBREVIATIONS

ACK Acknowledgment
AP Access Point
AWGN Additive White Gaussian Noise
BSS Basic Service Set
CSI Channel State Information
DL Downlink
MU-MIMO Multi User Multiple Input Multiple Output
NDP Null Data Packet
OBSS Overlapping BSS
SLNR Signal-to-Leakage-and-Noise ratio
STA Station
SNR Signal-to-Noise Ratio
SU-MIMO Single User Multiple Input Multiple Output
UL Uplink
WLAN Wireless Local Area Network
ZF Zero Forcer

DETAILED DESCRIPTION

Aspects of the present disclosure will be described more fully hereinafter with reference to the accompanying drawings. The apparatuses and methods disclosed herein can, however, be realized in many different forms and should not be construed as being limited to the aspects set forth herein.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

As described in the background, there is a need for access points, APs, to schedule sounding sequences in an efficient way. This can be particularly problematic in so called Overlapping Basic Service Sets, OBSS. OBSS, also referred to as Inter BSS Collision, refers to multiple BSSs, unrelated to each other, that are operating in the same channel and are close enough to hear each other physically. Hence, the transmissions by some STAs in one BSS will affect some STAs of other BSS. For better understanding of the proposed methods, a problem will now be discussed in more detail.

Figure 1:
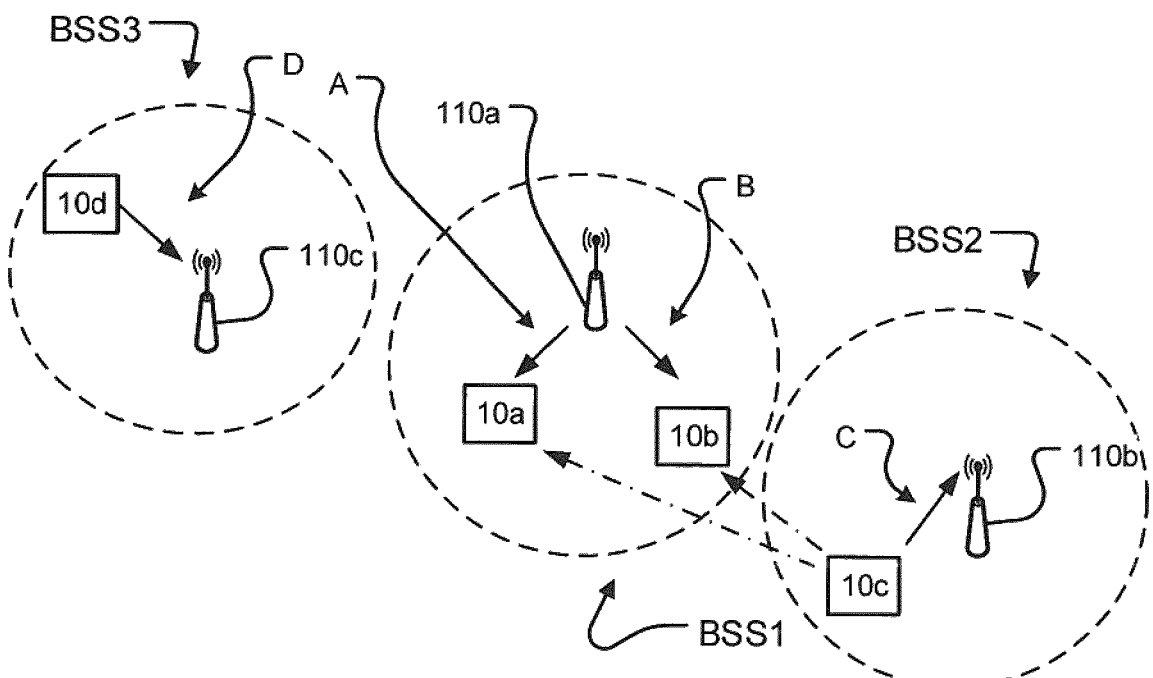
FIG. 1 illustrates a scenario with three Overlapping Basic Service Sets, OBSS.

An example of an OBSS with three BSS is shown in FIG. 1. In the example, an OBSS scenario with three BSSs operating at the same frequency is assumed (the proposed solution is of course not limited to 3 BSSs, this is only used for illustration purposes). Assume that a DL MU-MIMO transmission from AP 110a to wireless devices 10a and 10b is ongoing in BSS1. Simultaneously, two uplink, UL, transmissions are ongoing in BSS2 and BSS3. The UL transmission from wireless device 10c in BSS2 is interfering directly with wireless devices 10a and 10b, while the UL transmission from wireless device 10d in BSS3 is not interfering with wireless devices 10a and 10b.

The downlink channel estimates are obtained by the access points periodically or aperiodically transmitting pilot sounding sequences to the wireless devices which receive these sequences in order to estimate the channel. The channel estimates are e.g. fed back as so called Channel State Information, CSI, information.

Once the DL channel from each access point TX antenna to each wireless device RX antenna is known (or estimated), one may calculate a precoding for each physical resource (or group of physical resources) in order to transmit data streams from N TX antennas to the M RX antennas. The vector of data symbols to be simultaneously transmitted in a physical resource can be denoted:

$$x = \begin{bmatrix} x_0 \\ x_1 \\ \vdots \\ x_{D-1} \end{bmatrix}$$

The downlink channel matrix is denoted H. The transmitted signal vector from the N TX antennas is denoted y and the received signal vector collecting the received signals from all antennas of all users in the cluster of interest is denoted z. Applying a linear precoding matrix W, the received signal vector becomes:

$$z = Hy = HWx$$

Calculating the precoding matrix W requires knowledge of the downlink channel H, which is the composite channel of all the users, i.e., it is composed of the individual channels between the AP and each use; in practice in the form of a channel estimate $\hat{H}$ so that $W = f(\hat{H})$ (which can be a function of additional parameters as well) where $f$ is a function chosen e.g. to maximize the average system throughput, to maximize the cell edge user throughput or to minimize the total system TX power. Examples of classical precoding functions are SLNR (maximizing Signal-to-Leakage-and-Noise ratio), Zero Forcing (minimizing interference).

Hence, to calculate a precoder for transmitting data streams from the access point AP 110a to wireless devices 10a and 10b requires estimation of the channel from AP 110a to wireless device 10a and from AP 110a to wireless device 10b respectively. If one of the channel estimates is outdated, new sounding is required in order to make a new channel estimate, which may be used for calculating a new precoder.

The channel estimates corresponding to the channel from AP 110a to wireless device 10a and from AP 110a to wireless device 10b may be estimated simultaneously using a broadcasted sounding signal. From time to time it is also possible to re-estimate only one of the estimates, e.g. if one of the wireless devices is moving.

Figure 2:
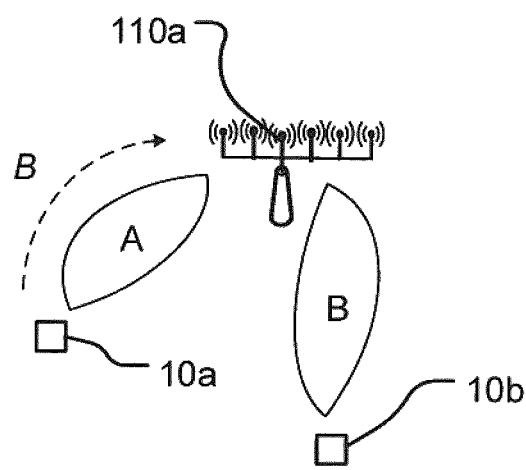
FIG. 2 illustrates an access point retrieving information about inter-stream interference from a wireless device.

One proposed solution for identifying outdated CSI at the AP for enhancing Downlink, DL, MU-MIMO, transmissions in WLAN systems is presented in "MU BFee Interference channel feedback", July 2015, by Sigurd Schelstraete (IEEE 802.11-15/0858), see FIG. 2. This document proposes that when each wireless device 10a, 10b, or station, STA, as frequently named in WLAN systems, receives the DL MU-MIMO transmission A, B, each of them should report to the AP 110a how strong the interfering streams from the other users of the Multi user transmission are at that specific wireless device.

In todays' WLAN standard, IEEE 802.11ac, the transmitted Downlink, DL, MU-MIMO packet from the Access point, AP, enables each device to estimate the channel between all transmitted streams from the AP and the device's receiving antennas. As an example, if the AP transmits 4 streams to 2 devices (2 for each device), with each device having 2 receiving antennas, then each device will estimate a 2×4 channel with the so called Null Data Packet, NDP packet. This is in contrast to old MU-MIMO packets in the DL, where a 2×2 channel would be estimated at each device since only 2 streams are transmitted to it. This estimated 2×4 channel contains the 2×2 channel between the streams intended for the specific device and its receiving antennas, but it also contains the 2×2 channel between the other user's streams (the interfering streams) and the specific device's receiving antennas. Hence, the device can thus measure the impact of the incoming interfering streams, by measuring the strength in the 2×2 interfering channel (intended for the other wireless device) that it has estimated.

Hence, each wireless device involved in a MIMO transmission has access to the channel between, streams transmitted by the same AP and being intended for other wireless devices, and its own receiving antennas.

If, in one wireless device, the interfering streams from the other users are strong, then this indicates that the channel estimate at the AP, which is used for the MU-MIMO transmission is outdated since the AP is not able to remove the interference by the precoding that is applied at the AP at the transmission. Hence, this tells the AP that is should probably start a new sounding procedure by sending out a Null Data Packet, NDP, as in 802.11ac, for obtaining new CSI information from the wireless devices.

The above solution should work well in a single Basic Service Set, BSS, environment; that is, an environment with a single AP and connected wireless devices. This is because the reported interference information by the wireless devices would indicate that the channel has changed significantly and new sounding is required. However, in an Overlapping Basic Service Set, OBSS, scenario, there may be problems with the above solution, which will now be further described referring again to FIG. 1.

After the DL MU-MIMO transmission to wireless devices 10a and 10b is finished, the wireless devices may start to transmit ACK packets to the AP if the packet was received correctly. Inter-stream interference estimated at each wireless device could be piggybacked on the ACK packets. When the AP receives the ACKs together with a measure of the inter-stream interference at wireless devices 10a and 10b, it needs to decide whether it should start a new DL MU-MIMO transmission or a sounding sequence for obtaining updated Channel State Information, CSI.

However, the, by the access point perceived increase in inter-stream interference at a wireless device could also have resulted from OBSS interference, rather than being caused by an outdated channel. Hence, it is hard for the AP to know whether the increased inter-stream interference reported by a wireless device is due to OBSS interference or an outdated channel.

Hence, according to some aspects of this disclosure, it is proposed that instead of basing this decision solely on the inter-stream interference information from the wireless devices, more information is gathered from the surrounding APs in BSS2 and BSS3 to make a better decision.

In a dense OBSS scenario, the reported inter-stream interference information from the wireless devices does not distinguish between true inter-stream interference, that is, interference at a wireless device caused by the streams intended for other users in a BSS, or OBSS interference; that is, interference coming from signals in an overlapping BSS. Hence, in the case where the reported interference is due to OBSS interference and the AP decides, based on the received inter-stream interference information from the wireless devices, that a new sounding sequence should start, the new CSI reports that the AP receives will be polluted by the OBSS interference. This could result in future DL MU-MIMO packets being lost, even if OBSS interference would not be present anymore, since the precoder construction at the AP is based on the polluted CSI. Not even rate adaptation, e.g. Minstrel algorithm, would help in this case, since if the CSI is highly polluted, the interfering streams will be strong at each wireless device and lowering the data rate will not help.

Figure 3:
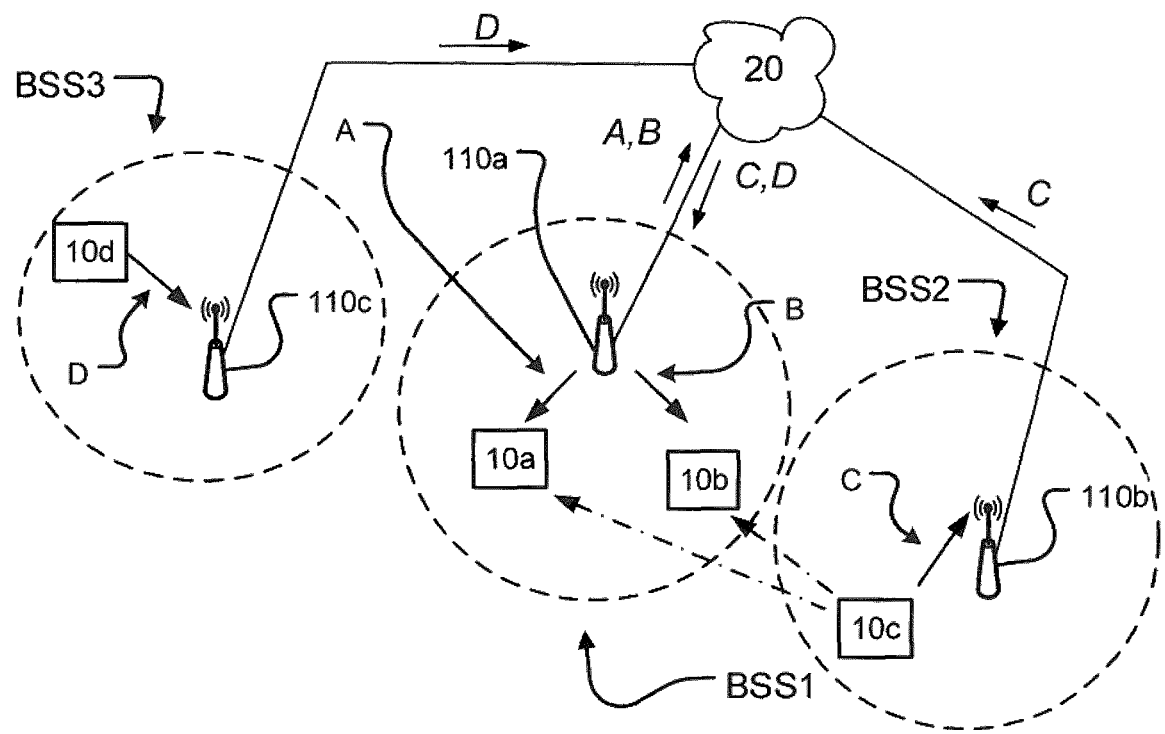
FIG. 3 illustrates an access point retrieving information about potentially interfering transmissions from a data storage in the scenario of FIG. 1.

The basic idea of the proposed technique is illustrated in FIG. 3. In this example, before making a decision about sounding, AP 110a performs a check. In other words the AP 110a consults a data storage 20 (e.g. a database), to which each AP 110a, 110b, 110c from all the BSS are connected. In this data storage, it can find the latest reported UL transmissions in each surrounding BSS. As an example, the data storage could contain a list of the following type:

TABLE 1

Example of a table in a data storage

| AP | STA | Time | Coordinates |
|---|---|---|---|
| 110b | 10c | T' | (x', y') |
| 110c | 10d | T" | (x", y") |

From this information, AP 110a can see in the data storage table that wireless device 10c in BSS2, located on coordinates (x',y') transmitted a packet C at time T' towards AP 110b of BSS2. Similarly, wireless device 10d of BSS3, located on (x",y"), transmitted a packet D at time T" towards AP 110b of BSS3. Hence, once an AP observes an UL transmission from some wireless device in its own cell, it reports it to the data storage, along with that wireless device's coordinates and the time of the transmission. Thus, AP 110a also reports the transmissions of packets A and B to the data storage. In this way, a data storage table like the one above can be constructed. In order to not exhaust the data storage memory with a lot of AP reports for each UL transmission, one could delete all data storage entries older than some predetermined time period.

In the example above the table only comprises information about uplink transmissions, because these are most likely to be interfering, as the access points are generally moving less. However, the table may also comprise information about downlink transmissions. In that case a column specifying whether the transmission is uplink or downlink is also needed.

Figure 4:
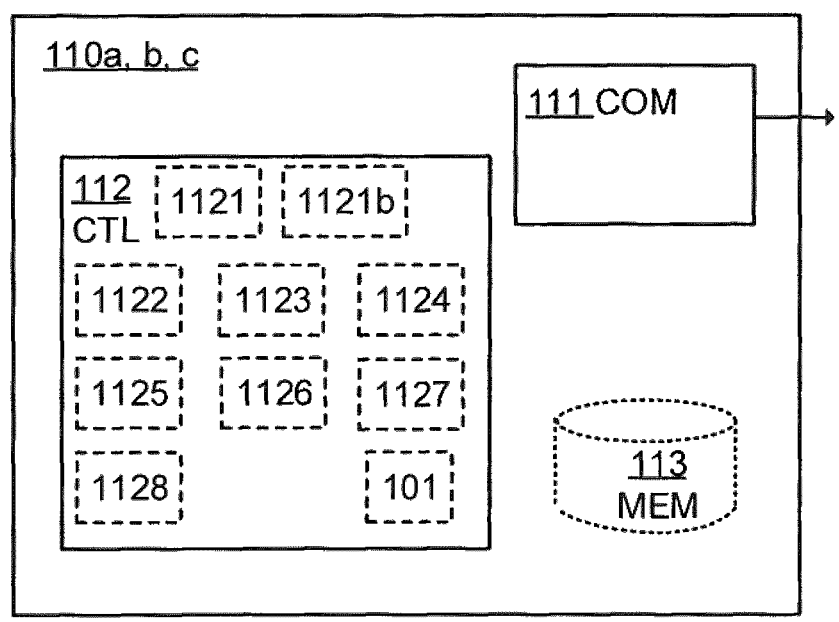
FIG. 4 is an example configuration of an access point, AP, according to some of the example embodiments.
Figure 5:
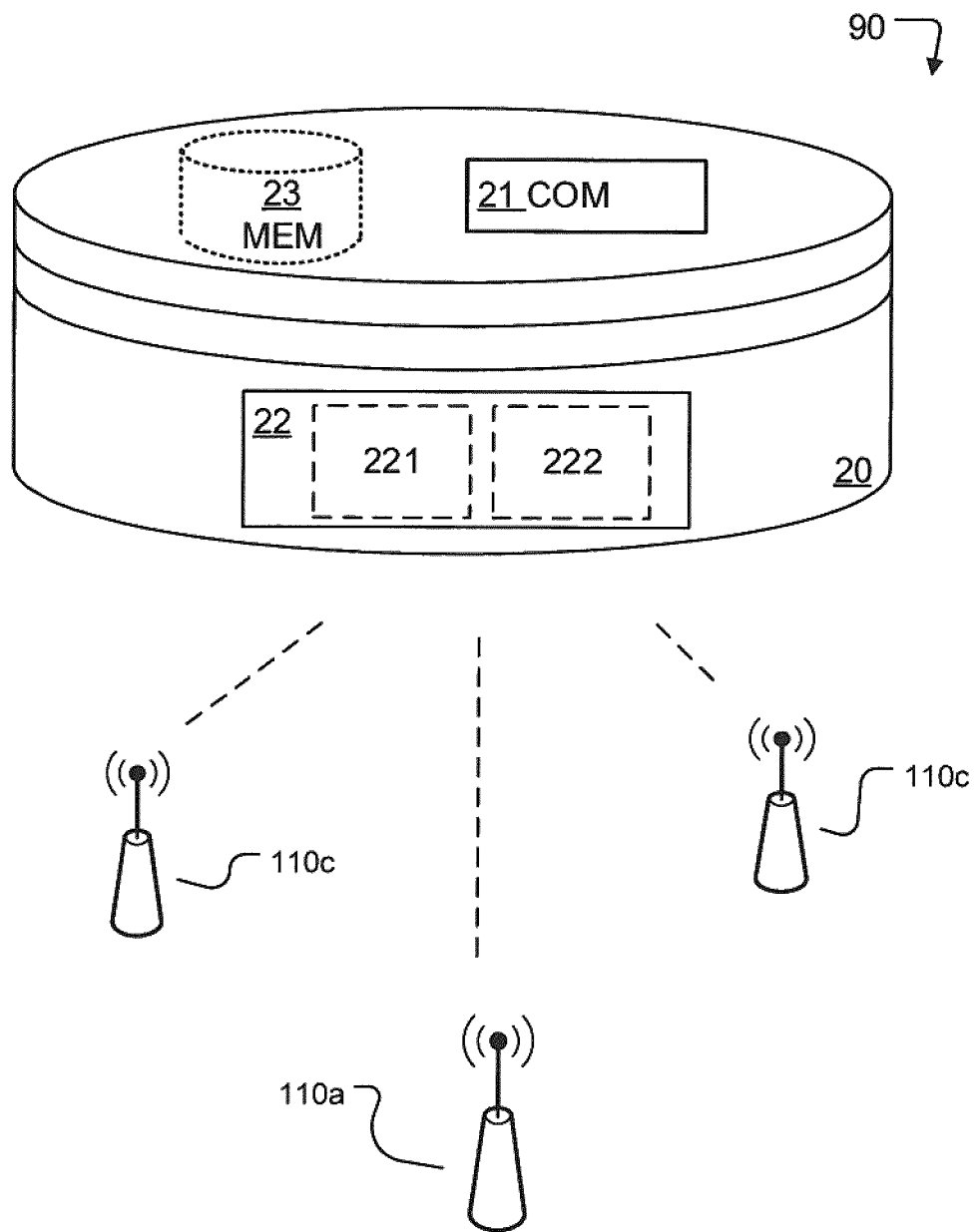
FIG. 5 is an example configuration of a system comprising a data storage.
Figure 6:
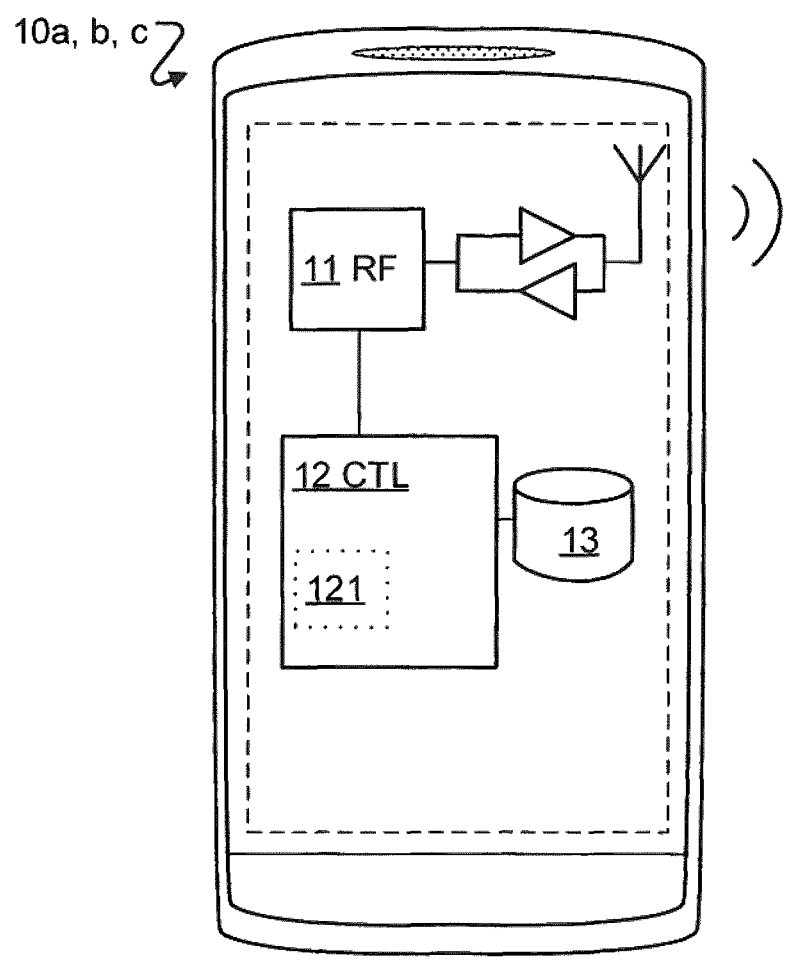
FIG. 6 is an example configuration of a wireless device, according to some of the example embodiments.

FIGS. 4, 5 and 6 illustrate examples of an access point 110; a system 90 comprising a data storage 20 and one or more access points 110a, 110b, 110c; and a wireless device 10 which may incorporate some of the example node operation embodiments discussed above and below. As shown in the Figures, the access point 110, the data storage 20 and the wireless device 10 may each comprise a communication interface 111, 21 and 11 respectively, configured to receive and transmit any form of communications or control signals within a network. It should be appreciated that the communication interface 111, 21, 11 may be comprised as any number of transceiving, receiving, and/or transmitting units or circuitry. It should further be appreciated that the communication interface 111, 21, 11 may be in the form of any input/output communications port known in the art. The communication interface 111, 21, 11 may comprise RF circuitry and baseband processing circuitry (not shown).

The access point 110, the data storage 20 and the wireless device 10 may further comprise at least one memory unit or circuitry 113, 23 and 13 respectively that may be in communication with the radio communication interface 111, 21, 11. The memory 113, 23, 13 may be configured to store received or transmitted data and/or executable program instructions. The memory 113, 23, 13 may be any suitable type of computer readable memory and may be of volatile and/or non-volatile type.

The access point 110, the data storage 20 and the wireless device 10 may further respectively comprise a controller or processing circuitry 112, 22, 12. The processing circuitry 112, 22, 12 may be any suitable type of computation unit, e.g. a microprocessor, digital signal processor, DSP, field programmable gate array, FPGA, or application specific integrated circuit, ASIC, or any other form of circuitry. It should be appreciated that the processing circuitry need not be provided as a single unit but may be provided as any number of units or circuitry. The processing circuitry is further adapted to perform all the aspects of the methods described above and below.

Figure 7:
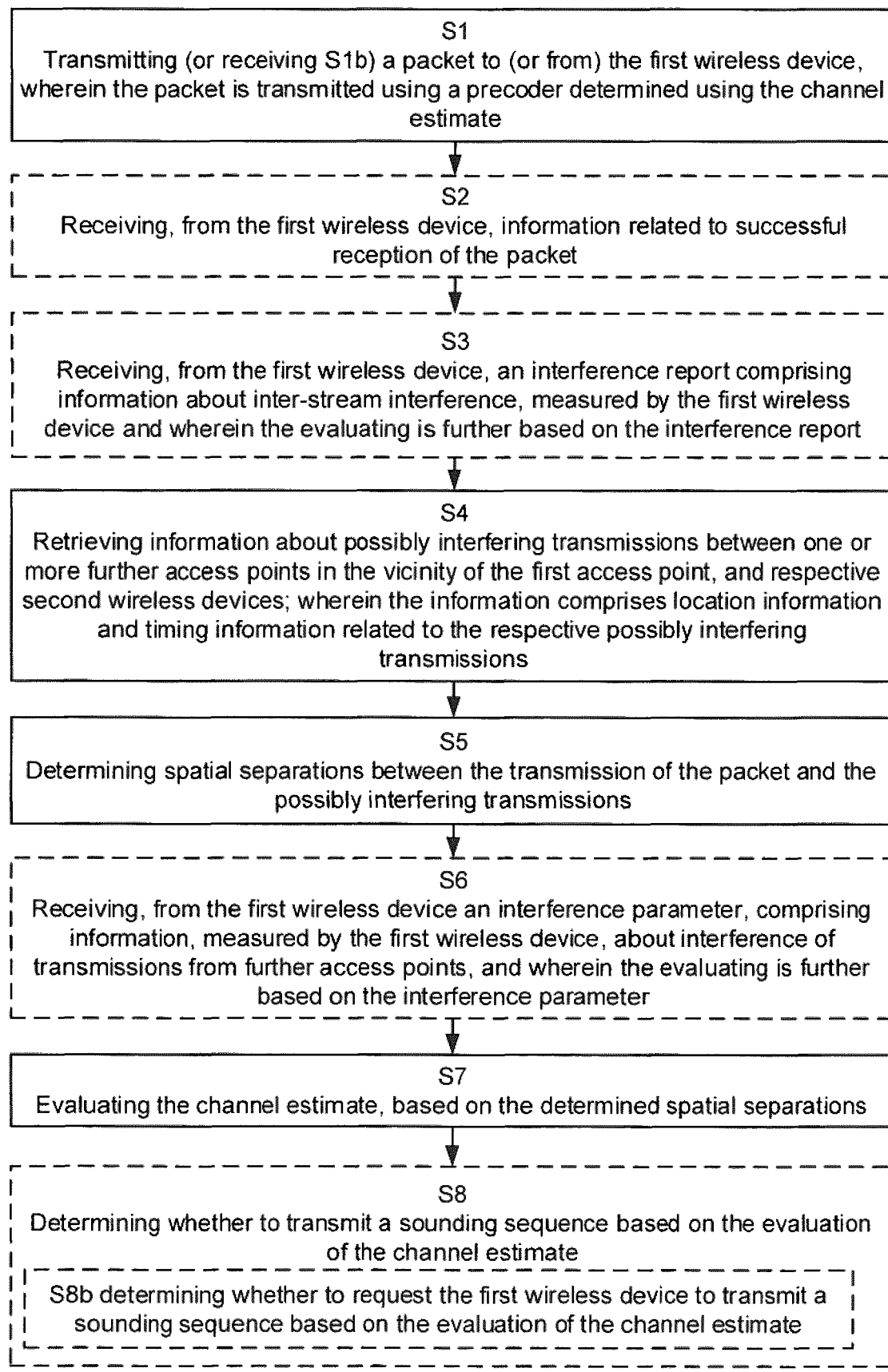
FIG. 7 is a flowchart illustrating embodiments of method steps in an access point.
Figure 8:
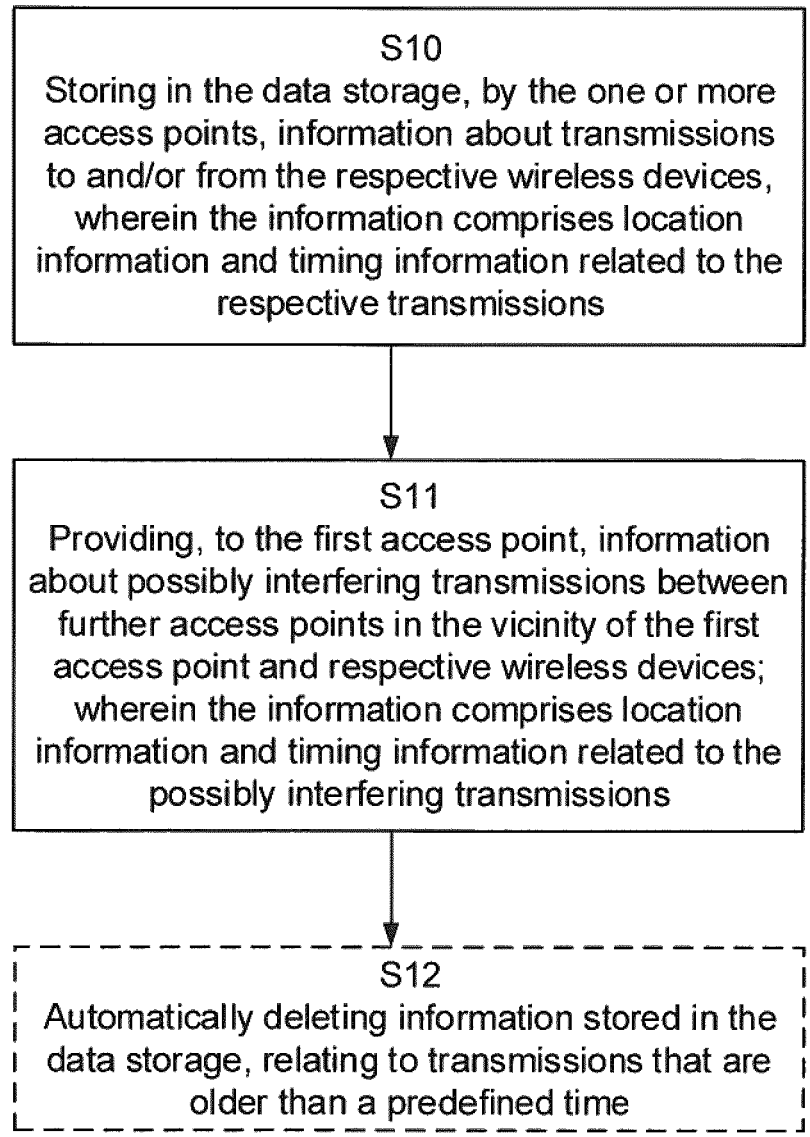
FIG. 8 is a flowchart illustrating embodiments of method steps in a system of a data storage and one or more access points.

FIGS. 7 and 8 illustrate the proposed technique implemented in an access point 110 of FIG. 4 and in the system of a data storage 20 and one or more access points 110b, 110c of FIG. 5.

It should be appreciated that in FIGS. 7 and 8 operations which are illustrated with a dashed border are optional or additional to the broader embodiments of this disclosure. The example operations may be performed in any suitable order and in any combination.

Figure 10A:
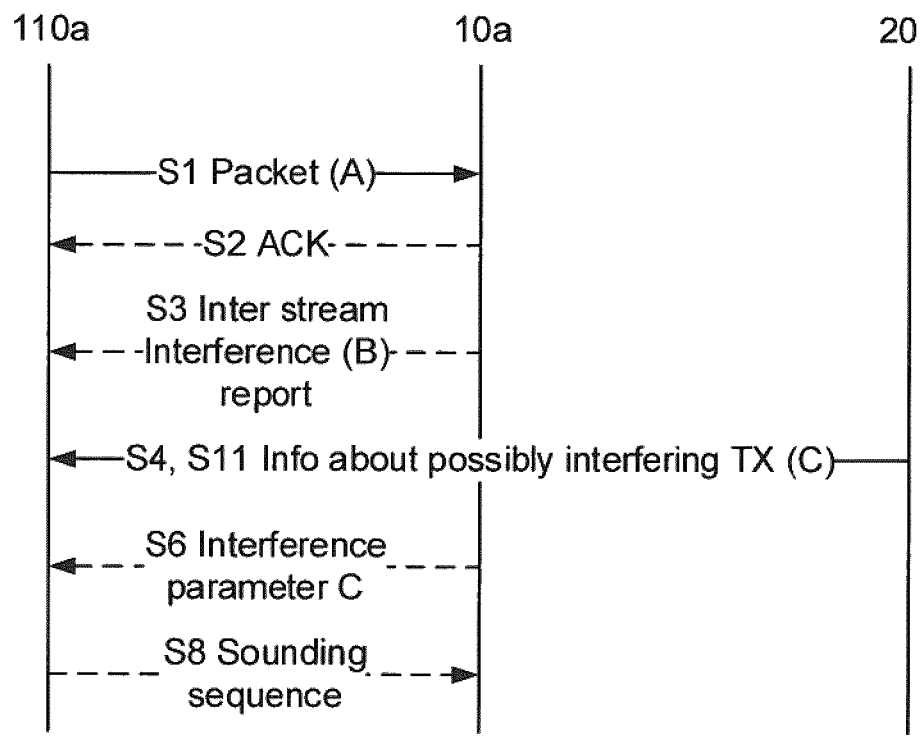
FIGS. 10a and 10b illustrates an example of signaling between the first access point, the first wireless device and the data storage for the downlink and the uplink respectively.
Figure 10B:
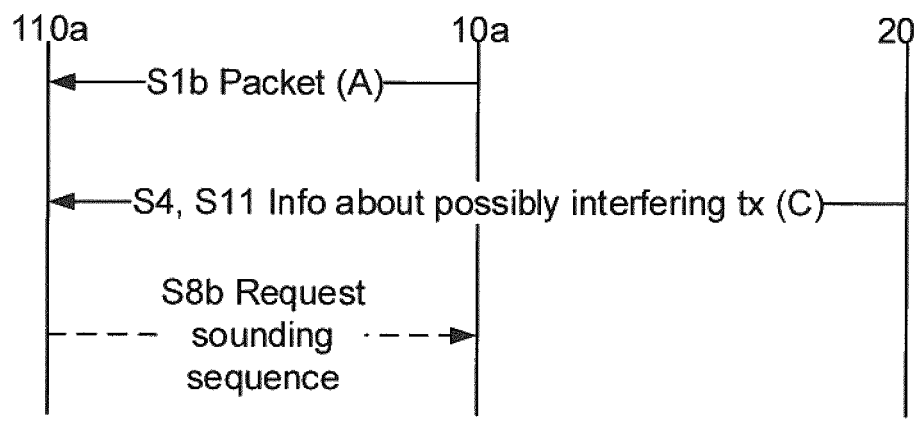

In addition FIGS. 10a and 10b illustrate the same operations as FIG. 8 as signaling between the first access point 110a, the first wireless device 10a and the data storage 20 storage for the downlink (FIG. 10a) and the uplink (FIG. 10b) aspects. The solid arrows are signals which are comprised in the broader example embodiment. The dashed arrows are signals used in further operations which may be taken in addition to the signaling of the solid border example embodiments.

Figure 9:
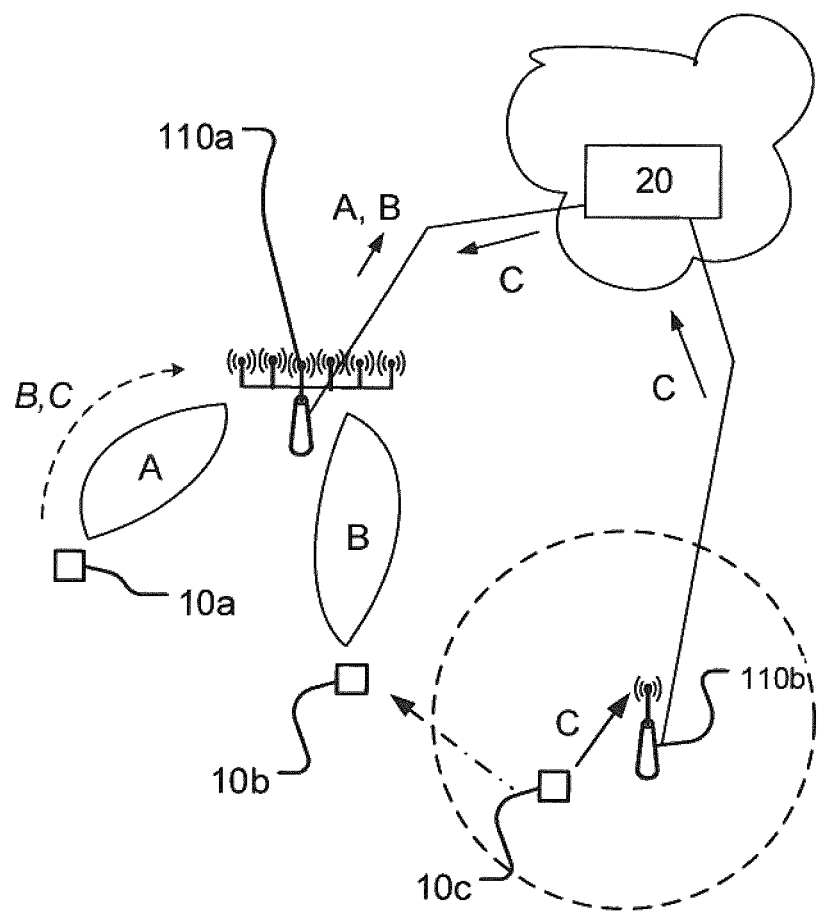
FIG. 9 illustrates an access point retrieving information about potentially interfering transmissions from a wireless device.

This disclosure proposes coordinating overlapping APs in an OBSS scenario, and using wireless device positions and transmission times, so as to be able to distinguish between outdated CSI information and OBSS interference information. The solution is based on the techniques described below that will more accurately predict whether the AP should start a sounding sequence or not. References are made to FIGS. 2 to 9, where FIG. 9 illustrates the packet transmissions of the various devices of the disclosure.

The disclosure relates to a first access point 110a arranged to communicate with one or more wireless devices 10a, 10b through information streams that are created using multiple co-located antennas.

The disclosure also provides for a method, performed in the first access point 110a, for evaluation of a channel estimate of a channel between the access point 110a and a first wireless device 10a. In this disclosure the first wireless device, refers to a wireless device for which the channel estimate is evaluated. The channel estimate is for example included in the Channel State Information, CSI. The access point uses multiple input multiple output, MIMO, for creating the streams. In this example so called multi user, MU, MIMO, where an access point transmits parallel independent information streams to multiple wireless devices, is used. The methods apply both in uplink and downlink. The downlink aspect of the proposed technique will now be described in more detail.

The method comprises transmitting S1 a packet A, to the first wireless device 10a, wherein the packet A is transmitted using a precoder determined using the channel estimate. The processing circuitry 112 of the first access point transmits S1 the packet A. According to some aspects, the processing circuitry comprises a transmitter module 1121 for transmitting the packet. The information streams are thus created by the access point transmitting a packet to the first wireless device.

According to some aspects, the method comprises receiving S2 from the first wireless device 10a, information related to successful reception of the packet. The processing circuitry 112 of the first access point receives S2, via the communication circuitry 111, the information. According to some aspects, the processing circuitry comprises a receiver 1122 for receiving. Thus, the access point is informed whether the transmitted packet has been successfully received or not. According to some aspects, the interference report and the information related to successful reception of the packet are included in an acknowledgement, ACK, message. An ACK message is an efficient way of receiving a confirmation that the transmitted packet has been successfully received. Thus, the first access point is informed about the interference and the successful reception of the packet.

The method then comprises retrieving S4 information about possibly interfering transmissions C between one or more further access points 110b in the vicinity of the first access point 110a, and respective second wireless devices 10c, 10d. In this disclosure second wireless devices are wireless devices that are not served by the first access point, but that are possibly interfering with the first access point. The information may e.g. be retrieved by reading it from an external data storage that holds information about all transmissions in a cluster of Basic Serivce Sets, BSS. The information comprises location information and timing information related to the respective possibly interfering transmissions. Hence, by reading this information, the access point knows which transmissions have taken place and when. The processing circuitry 112 of the first access point retrieves S4 the information, via the communication interface 111. According to some aspects, the processing circuitry comprises a retriever 1124 for retrieving. The access point thus has access to information regarding possibly interfering transmissions. The access point retrieves information regarding transmissions in other Basic Service Sets, BSSs, to be able to more accurately decide whether a new sounding sequence is necessary or not.

The spatial separations between the transmission A of the packet and the possibly interfering transmissions C are determined S5. Spatial separation refers to the spatial closeness of the transmissions. For example two overlapping beams are considered to have low spatial separation. The processing circuitry 112 of the first access point determines S5 the spatial separation. According to some aspects, the processing circuitry comprises a determiner 1125 for determining. By knowing the spatial separation, it is possible to evaluate S7 the channel estimate, based on the determined spatial separations. The simplest solution is that if a packet is not successfully received in a first wireless device, then the access point may check if there were any potentially interfering transmissions. If so, it may make a new attempt. Otherwise it may initiate a sounding procedure. Hence, a way to avoid unnecessary sounding is provided. Alternatively, the information from the database may be used together with other information, which will be further described below.

The processing circuitry 112 of the first access point evaluates S7 the channel estimate. According to some aspects, the processing circuitry comprises an evaluator 1127 for evaluating. In other words, the access point uses the spatial separation to determine if the channel estimate is valid or not. A small spatial separation gives an increased risk of interference. According to some aspects, the timing information related to the respective possibly interfering transmission is used when evaluating the channel estimate. This may be done in different ways.

In other words, a way to avoid unnecessary sounding, which blocks channel capacity, is provided. The solution reduces the number of cases where the AP performs unnecessary sounding due to reception of a polluted CSI from the wireless devices. This in turn results in significant throughput gains. Moreover, together with rate adaptation, the disclosure results in more packets being received at the wireless devices by not performing unnecessary sounding, resulting in further throughput gains.

The disclosure provides a solution to the above described shortcomings for identifying the need for new sounding frames. According to these aspects, MU MIMO is used, wherein the access point is transmitting parallel information streams to multiple wireless devices 10a, 10b. The proposed method then proposes to use the information about nearby interfering transmissions together with an inter-stream interference report in order to be able to verify the correctness of the interference report. In other words, the method then comprises, receiving S3, from the first wireless device 10a, an interference report comprising information about inter-stream interference, measured by the first wireless device 10a. The step of evaluating S5 the channel estimate is then further based on the interference report. The processing circuitry 112 is configured to cause the first access point 110a to receive S3, from the first wireless device 10a, the interference report. According to some aspects, the processing circuitry comprises a receiver 1123 for receiving. This implies that the first wireless device 10a measures inter-stream interference of parallel streams B transmitted by the first access point 110a and being intended for one or more third wireless devices 10b. In this disclosure the third wireless device(s) refers to wireless devices (other than the first wireless device) that are also served by the first access point. Hence, the first access point serves the first wireless device 10a and the third wireless device(s) 10b in a MU-MIMO way. However, it is the channel estimate between the access point and the first wireless device 10a that is estimated.

The evaluation S7 comprises, for example, determining whether a small spatial separation between the transmission and other transmissions in the vicinity of the access point, coincides with high reported inter-stream interference. The reason is that the interference report may also capture other interference than the inter-stream interferences, such as interference from nearby transmissions. By acquiring information about nearby transmissions from a database, the access point gets an indication whether the measured inter-stream interference is true inter-stream interference or interference from a nearby transmission in another Basic Service Set, BSS. Thus, the access point uses both the information from the possibly interfering transmissions and an interference report from the first wireless device to evaluate the channel estimate.

This enables the access point to make a decision whether to perform sounding or not. This is the case in the example described above in relation to FIG. 2. As described above, inter-stream interference is interference at a wireless device caused by the streams intended for other wireless devices in the same BSS. The process of sending information regarding inter-stream interference, measured by the first wireless device, to the access point has already been described above.

Here follows an example operation of the disclosure. Once AP 110a of FIGS. 3 and 9 has access to the information in the data storage, e.g. in the form of a table as described above (Table 1), it can infer whether a neighboring transmission caused the high interference observed by wireless device 10a and/or 10b. In the example, the AP 110a will find out that T' is close to the time that AP 110a transmitted the DL MU-MIMO transmission to wireless devices 10a and 10b. Moreover, by comparing the coordinates (x',y') with the coordinates of wireless devices 10a and 10b (which are assumed known to AP 110a due to location-aware communications), and thus realizing that wireless device 10c of BSS2 is spatially close to wireless devices 10a and 10b, it can infer that the reported increase in inter-stream interference is most probably due to interference from wireless device 10c. Next, AP 110a looks at the entry from AP 110c, and finds that even though T" might be close to its own DL transmission time, the position (x",y") is far away from wireless devices 10a and 10b. Hence, it knows that wireless device 10d probably did not cause any significant interference to wireless devices 10a and 10b.

Based on this information, AP 110a knows that it would be a bad decision to transmit a sounding packet, since it is very probable that the transmission from wireless device 10c interferes with wireless devices 10a and 10b. Hence, perceived inter-stream interference is likely caused by the transmission from 10c and not by an outdated channel estimate. Transmitting a sounding packet would result in polluted CSI being reported by wireless devices 10a and 10b, which (as explained above) results in future DL MU-MIMO packets being lost. Hence, performing sounding here would be detrimental for the throughput. Instead, using the information provided by the data storage, the sounding is avoided in this case. Moreover, if a rate adaptation algorithm is available at AP 110a, AP 110a could lower (or maintain) the rate to wireless device 10a and/or 10b in the next DL MU-MIMO transmission. This could actually still result in successful packet reception at wireless devices 10a and 10b, even though there still might be interference from wireless device 10c. The reason is that the channel may not be outdated, but the problem is the interference from wireless device 10c. The impact of this interference is reduced when the data rate to wireless devices 10a and 10b is lowered, or if the data rate is maintained and the packet is re-transmitted at a point in time when wireless device 10c is not transmitting in the interfering direction. This could result in a successful packet reception.

Note that, if instead a DL transmission by for example AP 110c was interfering with wireless devices 10a and 10b, then AP 110c would report its own transmission time to the data storage 20. Assuming that the APs are aware of each other's positions, which is the case for coordinated AP's, AP 110a can determine, based on AP 110c's transmission time, AP 110c's position and position of wireless devices 10a and 10b, whether the DL transmission from AP 110c actually causes interference to wireless devices 10a and 10b. Hence, in this way, both DL and UL interference from neighboring cells are handled.

The evaluation of the channel estimate may be used to determine the need for a sounding sequence. Thus, according to some aspects, the method comprises determining S8 whether to transmit a sounding sequence based on the evaluation S7 of the channel estimate. The processing circuitry 112 of the first access point determines S8 whether to transmit a sounding sequence. According to some aspects, the processing circuitry comprises a determiner 1128 for determining. In other words, when the access point has evaluated the channel estimate, it will be able to, based on the evaluation, determine if a new sounding is to take place. By using the evaluation to determine this, the actual correctness of the channel estimate is used to determine if new sounding is to be done. The determining is for example made by comparing the result of the evaluation of the channel estimate to a predetermined threshold. If the evaluation shows that the channel estimate is off by more than the threshold value, the sounding sequence is initiated.

Based on the information at AP 110a (e.g. received ACK with interference information, data storage table, etc.), an example of a sounding strategy at AP 110a is for example formulated as:

TABLE 2

Example of an AP sounding strategy

| ACK received? | Received inter-stream interference | Data storage indicates interference? | Perform sounding? |
| --- | --- | --- | --- |
| Yes | High | Yes | No |
| Yes | High | No | Yes |
| Yes | Low | Yes | No |
| Yes | Low | No | No |
| No | — | Yes | No |
| No | — | No | Yes |

Note from the decision table how, in this case, both the received inter-stream interference information and the data storage information are necessary to properly decide if sounding is necessary or not. For example, if there was no data storage information, the first two rows of the above table show that an ambiguous decision would arise, since sometimes the AP should send sounding and sometimes not. Also, if there is no inter-stream interference information at the AP, row 2 and 4 show an ambiguous decision in this case as well.

It is to be noted that the above example can also be applied to, and is useful for, Singe User MIMO, SU-MIMO, beamforming, which also requires sounding in the same manner as MU-MIMO. Basically, the only difference is that in this case, there is only one wireless device instead of two or more. However, in this case, there is no inter-stream interference feedback from the wireless device to the AP. Hence, the "Received inter-stream interference" column in the above decision table can be removed. The AP can decide if sounding is necessary based on the data storage information and whether the packet is received or not.

The above example can also be applied for determining whether UL Sounding is necessary in UL MU-MIMO transmissions. In other words, according to some aspects, the method comprises receiving S1b a packet from the first wireless device 10a, wherein the packet A is transmitted from a first wireless device 10a using a precoder determined using the channel estimate. The corresponding signaling between a first access point 110a, a data storage 20 and a first wireless device 10 is illustrated in FIG. 10a.

The processing circuitry 112 of the first access point transmits S1 the packet A. According to some aspects, the processing circuitry comprises a transmitter module 1121 for transmitting the packet. The information streams are thus created by the access point transmitting a packet to the first wireless device.

If the AP is unable to correctly decode a received MU-MIMO packet, transmitted by a wireless device, it consults the data storage 20 for information about neighboring transmissions. If it finds out that a simultaneous transmission occurred close by, then it would not initiate a new UL sounding procedure from the STAs. Instead, it would let the wireless devices retransmit the packets. As before, if the STAs are equipped with a rate adaptation algorithm, the data rate toward the AP can be lowered, which might result in successful packet reception at the AP. In the same manner as described above, the channel estimate may then be evaluated using the proposed methods.

According to some variants of these aspects, the method comprises determining S8b whether to request the first wireless device 10a to transmit a sounding sequence based on the evaluation S7 of the channel estimate. Hence after evaluation, the access point determines if it should request the first wireless device to initiate the sounding for the uplink channel. The determination is thus performed after the first access point has evaluated the channel estimate.

According to some aspects, the presence of inter-stream interference, measured by the wireless device 10a, triggers the first access point to evaluate the channel estimate. Hence, the access point does not need to evaluate the channel estimate without the trigger. This, of course, saves computational and communicational resources at the access point. This is an effective trigger for the evaluation since there is basically no need to evaluate the channel estimate if there is no interference.

There is a drawback that relates in general to location-aware communications. Even though the AP can see that an OBSS transmission took place close to its receiving wireless device, it is not necessarily true that the OBSS transmission is interfering with the receiving wireless device due to the fading environment. In other words, the fading between the OBSS transmitter and wireless devices 10a and 10b can be strong, and thus the OBSS interference does not incur any disturbance at wireless devices 10a and 10b. According to some aspects, the method comprises receiving S6, from the first wireless device 10a an interference parameter, comprising information, measured by the first wireless device 10a, about interference of transmissions C to or from further access points 110b, 110c, and wherein the evaluating S5 is further based on the interference parameter. In other words, the wireless device measures the aggregate interference on all channels, and not only the interference transmitted on the channels of the other streams transmitted by the access point 110a, which was measured when estimating inter-stream interference.

This means that the AP receives from each device, not only the measure of how strong the interfering streams are at each device, as discussed above, but additionally one or more other interference parameters. The other interference parameters may be included in the interference report discussed above, which is typically piggy-backed on the ACK transmitted by each device following a DL MU-MIMO transmission from the AP.

An example of another parameter, is e.g. a measure of OBSS interference experienced at each device. Given for example these two parameters and by obtaining appropriate information from the database as explained above, the AP can decide if the measured interference at each device is due to an outdated channel or something else.

Another example of an interference parameter reported by a device might e.g. be indices of subcarriers on which the interference was measured. This could help the AP decide appropriate subcarrier scheduling for the devices (also known as OFDMA). However, OFDMA is not defined in the current WLAN standard, but will be in the upcoming WLAN standard.

All in all, depending on what kind of problem one wants to address/solve, the interference report can contain different type of information.

The evaluation is thus based on both the information about possibly interfering transmissions and on an interference parameter measuring interference from other access points. The information about interference of transmissions C comprises for example Signal-to-Noise Ratio, SNR, information. Thus, the wireless device may send an estimate of the aggregated interference that it observes, possibly together with the inter-stream interference. This would help the AP to gain more insight whether the inter-stream interference depends on outdated CSI or due to OBSS interference. There are several algorithms in the literature, e.g. energy detection, which can be used to obtain an estimate of the aggregate OBSS interference. The processing circuitry 112 of the first access point receives S6 via the communication circuitry 111. According to some aspects, the processing circuitry comprises a receiver 112b for receiving.

As is shown in the example illustrated by FIG. 1, according to some aspects, the information about possibly interfering transmissions C is retrieved S4 from a data storage. Hence, the information is easily accessible to the access point. It is a simple matter for the access point to retrieve the data from the data storage. In this way, it is possible for all access points with access to the data storage to retrieve information regarding possibly interfering transmissions. The information is for example retrieved by the access point requesting information from the data storage regarding transmissions made in a specific time interval and/or in a specific area. According to some aspects, the retrieving S4 of information about possibly interfering transmissions C, comprises retrieving S4a information about other transmissions within a predefined distance from the first access point 10a. In other words, the retrieved information comprises transmissions within a predetermined distance from the access point. Thereby, the access point may avoid retrieving information regarding further access points' transmissions to wireless devices, or BSSs, which should not have interfering transmissions at BSS of the access point due to the distance between them. In other words, if the further access points are at a predetermined minimum distance away from the access point, the access point does not retrieve information regarding those further access points.

The information about possibly interfering transmissions C between further access points 110b in the vicinity of the first access point 110a, and respective second wireless devices 10c, comprises, according to some aspects, positioning information defining the positions of the second wireless devices 10c involved in the possibly interfering transmissions. The access device may thereby determine the exact location of devices which perform possibly interfering transmissions. By using this information, the access point can more accurately determine which transmissions were possibly interfering.

According to some aspects, the determining S5 comprises determining distances between the first wireless device 10a and the second wireless devices 10c involved in the possibly interfering transmissions. The distance is easily calculated by geometrical calculations when the access point has the geographical location of both the first and the second wireless device. The likelihood that a transmission to/from the second wireless device has interfered with a transmission to/from the first wireless device increases if the distance decreases. The spatial separation between the transmissions from the different wireless devices is for example determined in this way.

Another aspect of the disclosure is a communication system 90 comprising a data storage 20 and one or more access points 110a, 110b, 110c configured to communicate with one or more respective wireless devices 10a, 10b, 10c, 10d The corresponding method steps performed in the communication system 90, comprising a data storage 20 and one or more access points 110a, 110b, 110c, for enabling channel estimation evaluation in the first access point 110a, will now be described with reference to FIG. 8. An example system with the data storage and three access points is, as previously discussed, illustrated in FIGS. 3 and 5. The one or more access points 110b, 110c each comprise a communication interface 111 and processing circuitry 112 as illustrated in FIG. 3. The method comprises storing S10 in the data storage, by the one or more access points 110a, 110b, 110c, information about transmissions to and/or from the respective wireless devices 10a, 10b, 10c, 10d, wherein the information comprises location information and timing information related to the respective transmissions. The processing circuitry 112 is configured to cause the one or more access points 110a, 110b, 110c to store S10 in the data storage information about transmissions to and/or from the respective wireless devices 10a, 10c, 10d, wherein the information comprises location information and timing information related to the respective transmissions. According to some aspects, the processing circuitry of the access points comprises a storer 101 for storing. Storing comprises for example, sending the information to the data storage and indicating that the information should be stored. The method of the system further comprises providing S11, to the first access point 110a, information about possibly interfering transmissions C between further access points 110b, 110c in the vicinity of the first access point 110a and respective wireless devices 10c, 10d; wherein the information comprises location information and timing information related to the possibly interfering transmissions. The processing circuitry 22 of the data storage 20 is configured to cause the data storage 20 to provide S11, via the communication interface 21, to the first access point 110a, the information about possibly interfering transmissions C. According to some aspects, the processing circuitry 22 of the data storage comprises a provider 221 for providing. In other words, data stored in the data storage can be retrieved by an access point evaluating a channel estimate for the reasons explained above. Using a data storage enables multiple access points to access the information for use in evaluating channel estimates. In other words, the above described data storage is updated by the access points with information regarding transmissions and the data storage provides the access points information regarding the possibly interfering transmissions.

Retrieving information regarding possibly interfering transmissions has been explained above. The data storage answers, according to some aspects, a request from an access point to send the information.

As previously discussed, the disclosure utilizes coordination between AP's through a data storage. Each AP reports information about transmissions ongoing in its own BSS, either UL or DL, to the data storage. From this information, together with interference reports from the wireless devices receiving DL transmission, the transmitting AP can accurately decide if a sounding is necessary or not. This idea, as explained above, can be used both for DL and UL, and for MU-MIMO and SU-MIMO transmissions.

The data stored in the data storage is for example stored in a table. For example, a table comprises the information as shown in the data storage table 1 above. According to some aspects, it is possible for access point to add/change the information. For example, the APs may register the time when a certain transmission stops. This would further help AP 110a in the example described in connection to FIG. 3 to determine whether sounding should be performed. If the transmission (start) time for the OBSS interference is much earlier than the transmission time of AP1, it doesn't necessarily mean that the interference will be over by the time that AP1 transmits a new DL packet or a sounding packet. It could be that the interference is a very long packet sent by a wireless device in an overlapping BSS. Hence, in this case, it would be important to register when this transmission stops as well. Then AP 110a could for certain know that at this moment, there is no interference, and take actions based on that. According to some aspects, the start time and/or the end time of a communication are stored in the data storage.

According to some aspects, the information comprises positioning information defining the positions of the wireless devices 10c involved in the possibly interfering transmissions. The information defining the positions is used as described above and with the same advantages.

According to some aspects, the method comprises automatically deleting S12 information stored in the data storage, relating to transmissions that are older than a predefined time. The processing circuitry 22 of the data storage is configured to delete S12 the information. According to some aspects the processing circuitry comprises a deleter 222 for deleting. This is to avoid storing large amounts of data as well as to avoid storing locations of wireless devices for a long time.

According to some aspects, the disclosure also relates to a computer program comprising computer program code which, when executed in a programmable controller of access point 110a, causes the access point to execute the methods described above and below. In other words, the disclosure also relates to a computer readable storage medium, having stored there on a computer program which, when executed in a programmable controller of an access point, causes the access point to execute the methods described above and below.

Within the context of this disclosure, the term wireless device encompasses any terminal which is able to communicate wirelessly with an access point by transmitting and/or receiving wireless signals. Thus, the term "wireless terminal" encompasses, but is not limited to: a user equipment, a mobile terminal, a stationary or mobile wireless device for machine-to-machine communication, an integrated or embedded wireless card, an externally plugged in wireless card, etc.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. According to some aspects, the disclosure relates to a computer program comprising computer program code which, when executed in a programmable controller of a first access point 110a, causes the first access point 110a to execute the methods described above and below. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method performed in a first access point arranged to communicate with one or more wireless devices of a first Basic Service Set (BSS) through information streams that are created using multiple co-located antennas, for evaluation of a channel estimate of a channel between the access point and a first wireless device of the one or more wireless devices of the first BSS, the method comprising:
the first access point performing:
transmitting or receiving a packet, to or from, the first wireless device, wherein the packet is transmitted using a precoder determined using the channel estimate;
retrieving information about possibly interfering transmissions between one or more further access points and respective one or more second wireless devices associated with respective one or more further BSSs in the vicinity of the first access point; wherein the information comprises location information related to the respective possibly interfering transmissions and timing information related to the respective possibly interfering transmissions;
using the retrieved information to determine spatial separations between the transmission of the packet and the possibly interfering transmissions;
evaluating the channel estimate, based on at least the determined spatial separations, to decide whether a detected increase in interference associated with the transmission or reception of the packet is attributable to interference originating within the first BSS or whether the detected increase in interference associated with the transmission or reception of the packet is attributable to interference originating from one or more of the one or more further BSSs;
transmitting a sounding sequence in response to a decision that the detected increase in interference associated with the transmission or reception of the packet is attributable to interference originating within the first BSS; and
refraining from transmitting the sounding sequence in response to a decision that the detected increase in interference associated with the transmission or reception of the packet is attributable to interference originating from the one or more of the one or more further BSSs.

2. The method of claim 1, wherein the transmitting comprises transmitting parallel information streams to multiple wireless devices, and wherein the method comprises:
receiving, from the first wireless device, an interference report comprising information about inter-stream interference, measured by the first wireless device and wherein the evaluating is further based on the interference report.

3. The method of claim 2, wherein the presence of inter-stream interference, measured by the first wireless device, triggers the first access point to evaluate the channel estimate.

4. The method of claim 2, comprising:
receiving, from the first wireless device, information related to successful reception of the packet.

5. The method of claim 4, wherein the interference report and the information related to successful reception of the packet are included in an acknowledgement, ACK, message.

6. The method of claim 2, comprising:
receiving, from the first wireless device an interference parameter, comprising information, measured by the first wireless device, about interference of transmissions to or from the one or more further access points, and wherein the evaluating is further based on the interference parameter.

7. The method of claim 1, comprising:
determining whether to request the first wireless device to transmit a sounding sequence based on the evaluation of the channel estimate.

8. The method of claim 1, wherein the information about possibly interfering transmissions is retrieved from a data storage.

9. The method of claim 1, wherein the retrieving of information about possibly interfering transmissions, comprises retrieving information about other transmissions within a predefined distance from the first access point.

10. The method of claim 1, wherein the information about possibly interfering transmissions between the one or more further access points in the vicinity of the first access point, and the respective one or more second wireless devices, comprises positioning information defining the positions of the one or more second wireless devices involved in the possibly interfering transmissions.

11. The method of claim 1, wherein the using the retrieved information to determine comprises determining distances between the first wireless device and the one or more second wireless devices involved in the possibly interfering transmissions.

12. A first access point arranged to communicate with one or more wireless devices of a first Basic Service Set (BSS) through information streams that are created using multiple co-located antennas, the first access point comprising:
a communication interface;
processing circuitry configured to cause the first access point:
to transmit or receive a packet, to or from, a first wireless device of the one or more wireless devices of the first BSS, wherein the packet is transmitted using a precoder determined using a channel estimate;
to retrieve information about possibly interfering transmissions between one or more further access points and respective one or more second wireless devices associated with respective one or more further BSSs in the vicinity of the first access point; wherein the information comprises location information related to the respective possibly interfering transmissions and timing information related to the respective possibly interfering transmissions;
to use the retrieved information to determine spatial separations between the transmission of the packet and the possibly interfering transmissions;
to evaluate the channel estimate, based on at least the determined spatial separations, to decide whether a detected increase in interference associated with the transmission or reception of the packet is attributable to interference originating within the first BSS or whether the detected increase in interference associated with the transmission or reception of the packet is attributable to interference originating from one or more of the one or more further BSSs;
to transmit a sounding sequence in response to a decision that the detected increase in interference associated with the transmission or reception of the packet is attributable to interference originating within the first BSS; and
refrain from transmitting the sounding sequence in response to a decision that the detected increase in interference associated with the transmission or reception of the packet is attributable to interference originating from the one or more of the one or more further BSSs.

13. The first access point of claim 12, wherein the transmitting comprises transmitting parallel information streams to multiple wireless devices, and wherein the processing circuitry is configured to cause the first access point:
to receive, from the first wireless device, an interference report comprising information about inter-stream interference, measured by the first wireless device and wherein the evaluating is further based on the interference report.

14. A non-transitory computer-readable storage medium comprising computer program code which, when executed in a programmable controller of an access point arranged to communicate with one or more wireless devices of a first Basic Service Set (BSS) through information streams that are created using multiple co-located antennas, causes the access point to execute a method for evaluation of a channel estimate of a channel between the access point and a first wireless device of the one or more wireless devices of the first BSS, the method comprising:
the first access point performing:
transmitting or receiving a packet, to or from, the first wireless device, wherein the packet is transmitted using a precoder determined using the channel estimate;
retrieving information about possibly interfering transmissions between one or more further access points and respective one or more second wireless devices associated with respective one or more further BSSs in the vicinity of the first access point; wherein the information comprises location information related to the respective possibly interfering transmissions and timing information related to the respective possibly interfering transmissions;
using the retrieved information to determine spatial separations between the transmission of the packet and the possibly interfering transmissions;
evaluating the channel estimate, based on at least the determined spatial separations, to decide whether a detected increase in interference associated with the transmission or reception of the packet is attributable to interference originating within the first BSS or whether the detected increase in interference associated with the transmission or reception of the packet is attributable to interference originating from one or more of the one or more further BSSs;
transmitting a sounding sequence in response to a decision that the detected increase in interference associated with the transmission or reception of the packet is attributable to interference originating within the first BSS; and
refraining from transmitting the sounding sequence in response to a decision that the detected increase in interference associated with the transmission or reception of the packet is attributable to interference originating from the one or more of the one or more further BSSs.

* * * * *